United States Patent
Cohen et al.

(10) Patent No.: US 9,154,869 B2
(45) Date of Patent: Oct. 6, 2015

(54) SPEAKER WITH A LARGE VOLUME CHAMBER AND A SMALLER VOLUME CHAMBER

(75) Inventors: Sawyer I. Cohen, Sunnyvale, CA (US); Christopher Wilk, Sunnyvale, CA (US); Ruchir M. Dave, San Jose, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/343,606

(22) Filed: Jan. 4, 2012

(65) Prior Publication Data

US 2013/0170688 A1 Jul. 4, 2013

(51) Int. Cl.
*H04R 1/20* (2006.01)
*H04R 1/28* (2006.01)
*H04R 1/30* (2006.01)
(Continued)

(52) U.S. Cl.
CPC .............. *H04R 1/2842* (2013.01); *H04M 1/035* (2013.01); *H04R 1/30* (2013.01); *H04M 1/6041* (2013.01); *H04R 2499/11* (2013.01)

(58) Field of Classification Search
CPC .......... H04R 1/02; H04R 1/021; H04R 1/025; H04R 1/30; H04R 1/323; H04R 1/34; H04R 1/345; H04R 5/02; H04R 2499/11; B60R 11/0217
USPC ......... 381/337–338, 339–340, 345, 351, 353, 381/228, 342, 346–34; 181/160, 182, 152, 181/159, 177, 198–199, 148, 150, 153, 175, 181/187, 189
See application file for complete search history.

(56) References Cited

U.S. PATENT DOCUMENTS

| | | | | |
|---|---|---|---|---|
| 5,737,435 A | * | 4/1998 | De Poortere et al. | ......... 381/340 |
| 5,865,935 A | | 2/1999 | Ozimek et al. | |
| 5,963,640 A | * | 10/1999 | Rabe | ........................ 379/433.02 |

(Continued)

FOREIGN PATENT DOCUMENTS

| | | |
|---|---|---|
| CA | 2 795 676 A1 | 12/2011 |
| CN | 201435742 | 3/2010 |

(Continued)

OTHER PUBLICATIONS

PCT International Search Report and Written Opinion of the International Searching Authority for International Application No. PCT/US2013/020167 (9 pages).

(Continued)

*Primary Examiner* — Ahmad F Matar
*Assistant Examiner* — Katherine Faley
(74) *Attorney, Agent, or Firm* — Blakely, Sokoloff, Taylor & Zafman LLP

(57) ABSTRACT

A portable electronic device having an enclosure having a top wall, a bottom wall, at least one sidewall connecting the top wall to the bottom wall, an acoustic output opening and a back volume defined by the top wall, the bottom wall and the at least one sidewall. A speaker driver is positioned within the enclosure, the speaker driver including a sound radiating surface having a top face and a bottom face for emitting sound waves therefrom. A frame member is attached to the speaker driver, the frame member forming a front volume chamber acoustically coupling the top face of the sound radiating surface to the acoustic output opening and a back volume chamber that overlaps a side of the speaker drive and acoustically couples the bottom face of the sound radiating surface to the back volume.

10 Claims, 6 Drawing Sheets

(51) Int. Cl.
*H04M 1/03* (2006.01)
*H04M 1/60* (2006.01)

(56) References Cited

U.S. PATENT DOCUMENTS

| | | | |
|---|---|---|---|
| 6,389,145 | B2 | 5/2002 | Baumhauer, Jr. et al. |
| 6,473,625 | B1 | 10/2002 | Williams et al. |
| 6,759,266 | B1 | 7/2004 | Hoffman |
| 6,838,301 | B2 | 1/2005 | Zheng et al. |
| 7,099,484 | B2 | 8/2006 | Vonlanthen |
| 7,169,645 | B2 | 1/2007 | Bolken et al. |
| 7,408,205 | B2 | 8/2008 | Webster et al. |
| 7,433,483 | B2 | 10/2008 | Fincham |
| 7,446,356 | B2 | 11/2008 | Misawa |
| 7,508,933 | B2 | 3/2009 | Yang |
| 2001/0012371 | A1 | 8/2001 | Baumhauer, Jr. et al. |
| 2006/0067557 | A1 | 3/2006 | Imamura |
| 2006/0269095 | A1* | 11/2006 | Matsumura et al. .......... 381/421 |
| 2007/0154053 | A1 | 7/2007 | Yang |
| 2009/0154751 | A1* | 6/2009 | Robineau ...................... 381/340 |
| 2010/0189284 | A1 | 7/2010 | Kuze et al. |
| 2010/0331058 | A1 | 12/2010 | Qingshan et al. |
| 2011/0050941 | A1 | 3/2011 | Hiramoto et al. |
| 2011/0164767 | A1 | 7/2011 | Goel et al. |
| 2011/0255726 | A1 | 10/2011 | Yu et al. |
| 2012/0099751 | A1* | 4/2012 | Hampton et al. ............. 381/351 |

FOREIGN PATENT DOCUMENTS

| | | | |
|---|---|---|---|
| GB | 2463529 | A | 3/2010 |
| JP | 60153089 | | 10/1985 |
| JP | 09509817 | | 9/1997 |
| JP | 2006108791 | | 4/2006 |
| WO | WO-9620576 | | 7/1996 |
| WO | WO 97/42747 | A1 | 11/1997 |
| WO | WO 02/34006 | A2 | 4/2002 |

OTHER PUBLICATIONS

PCT International Search Report and Written Opinion of the International Searching Authority for PCT/US2013/020165 mailed Mar. 14, 2013.
Apple Inc., Japanese Office Action dated Dec. 18, 2013, JP Appln. No. 2013-010590, 6 pages.
Apple Inc., Australian Office Action dated Nov. 20, 2013, AU Appln. No. 2013200081, 6 pages.
Apple Inc., Australian Office Action dated Jul. 25, 2014, AU Appln. No. 2013200081, 5 pages.
International Preliminary Report on Patentability for corresponding International Application No. PCT/US2013/020167, mailing date Jul. 17, 2014, 8 pages.
Extended European Search Report for corresponding European Application No. EP 13 15 0327, dated Jun. 25, 2014, 9 pages.
Chinese Office Action dated Feb. 2, 2015, CN Appln. No. 201310000679.X with English-language translation, 23 pages.
European Office Action dated Mar. 25, 2015 for EP Application No. EP13150327.8, 7 pages.
Taiwanese Office Action dated Nov. 7, 2014, TW Appln. 102100135 with English-language translation, 10 pages.

* cited by examiner

SPEAKER WITH A LARGE VOLUME CHAMBER AND A SMALLER VOLUME CHAMBER

FIELD

An embodiment of the invention is directed to a speaker assembly having a reduced front volume. Other embodiments are also described and claimed.

BACKGROUND

In modern consumer electronics, audio capability is playing an increasingly larger role as improvements in digital audio signal processing and audio content delivery continue to happen. There is a range of consumer electronics devices that are not dedicated or specialized audio playback devices, yet can benefit from improved audio performance. For instance, smart phones are ubiquitous. These devices, however, do not have sufficient space to house high fidelity speakers. This is also true for portable personal computers such as laptop, notebook, and tablet computers, and, to a lesser extent, desktop personal computers and low profile television sets with built-in speakers. Such devices may require speaker enclosures or boxes that have a significant front volume, the space through a duct or channel in which sound from the front face of the driver diaphragm travels to an acoustic output port of the device. This may allow the driver to be set further rearward from the exit port of the enclosure. The speaker box also defines a back volume, the space within the enclosure that is open to the rear face of the diaphragm. The back volume in such a device is relatively small compared to, for instance, stand alone high fidelity speakers and dedicated digital music systems for handheld media players. In small back volume speaker boxes, improvements in low frequency performance are difficult to achieve since the air inside the box is confined to a small space which in turn may reduce the compliance of the driver. In addition, a large front volume tends to reduce the quality of sound output from the device.

SUMMARY

An embodiment of the invention is a portable electronic audio device having an enclosure formed by a top wall, a bottom wall, at least one sidewall connecting the top wall to the bottom wall and an acoustic output opening. The enclosure further includes a back volume defined by the top wall, the bottom wall and the at least one sidewall. A speaker driver is positioned within the enclosure, the speaker driver having a sound radiating surface having a top face and a bottom face for emitting sound waves therefrom. A frame member is attached to the speaker driver and defines a front volume chamber and a back volume chamber within the enclosure. The front volume chamber acoustically couples the top face of the sound radiating surface to the acoustic output opening and has a reduced volume to improve sound output of the device. The back volume chamber overlaps a side of the driver facing the acoustic output opening to form a back volume chamber having a greater volume than a volume of the front volume chamber. The enlarged back volume area helps to control a low frequency sound quality of the speaker driver.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Figure 1:
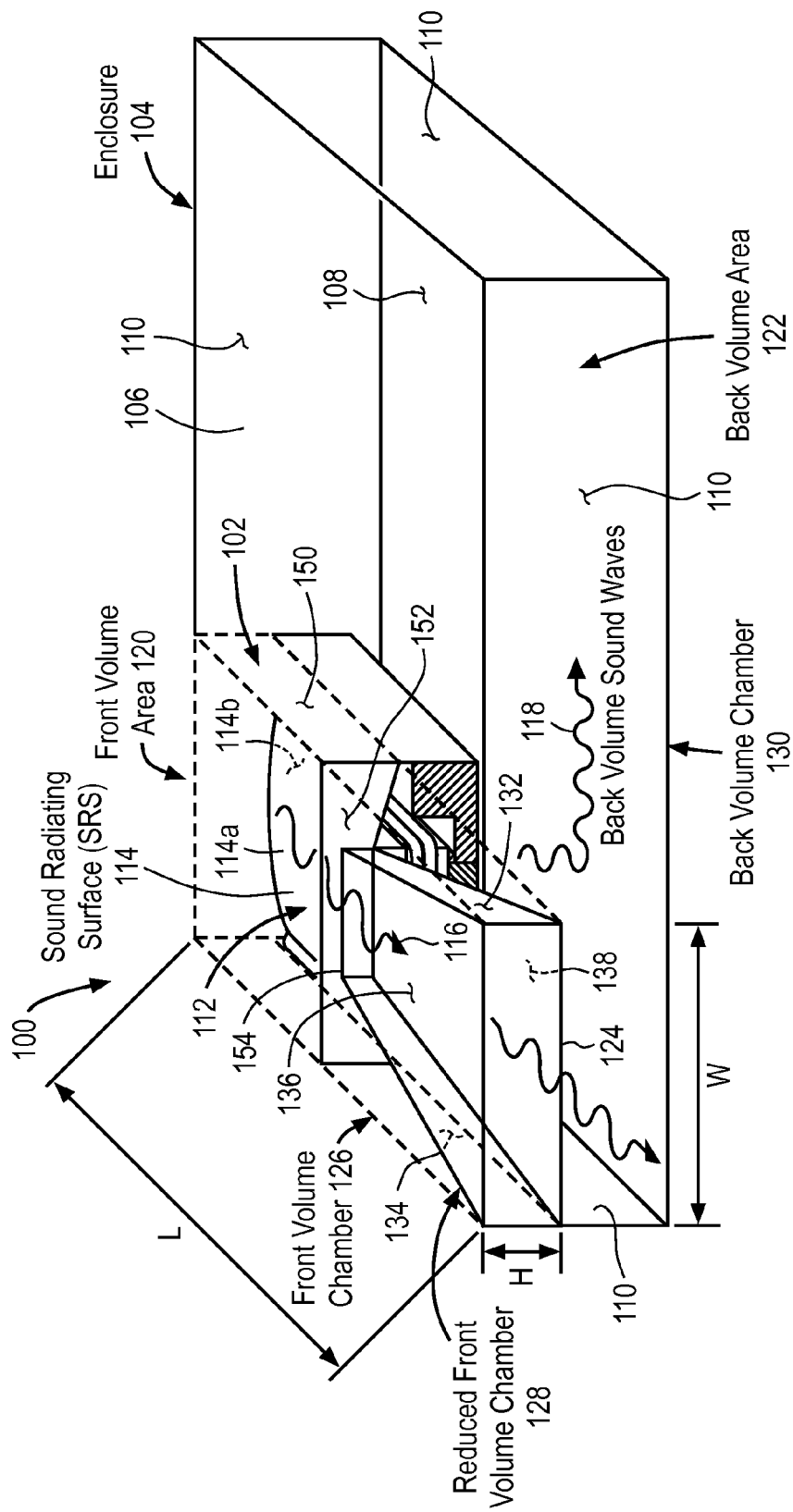
FIG. 1 is a perspective view of a speaker assembly and enclosure having a front volume.

FIG. 1 is a perspective view of a speaker assembly and enclosure having a front volume. Speaker assembly 100 may be built into frame 102 which may be of a typical material used for speaker enclosures, such as plastic. The frame 102 may be part of a speaker enclosure or box 104. The speaker enclosure or box 104 may be formed by top wall 106, bottom wall 108 and side walls 110 connecting top wall 106 to bottom wall 108. Speaker assembly 100 may include speaker driver 112 having sound radiating surface (SRS) 114 for producing acoustic or sound waves. Some of the sound waves produced by sound radiating surface 114 are directed out of acoustic output opening 124 of enclosure 104 while others are directed toward back volume 122 of enclosure 104. For example, sound waves 116 produced by top face 114a of SRS 114 may be directed to acoustic output opening 124 while sound waves produced by bottom face 114b of SRS 114 may be directed to back volume area 122.

Sound waves 116, 118 produced by opposing faces 114a, 114b, respectively, of SRS 114 are out of phase with one another therefore it is important to prevent sound waves 116, 118 from interacting with one another. To prevent such interactions, the area within enclosure 104 is divided into a front volume area 120 and a back volume area 122 that are isolated from one another. Front volume area 120 is defined by front volume chamber 126 that acoustically connects the top face 114a of the SRS 114 to the acoustic output opening 124. Back volume area 122 is defined by back volume chamber 130 that acoustically connects the bottom face 114b of the SRS 114 to the remaining area within enclosure 104.

In the example of FIG. 1, front volume area 120 between top face 114a of SRS 114 and acoustic output opening 124 within which sound waves 116 travel is generally referred to as "front volume" because it acoustically connects the top face 114a of the SRS 114 to the acoustic output opening 124 and isolates sound waves 116 generated by top face 114a from sound waves 118 generated by bottom face 114b. The remaining area 122 of enclosure 104 within which sound waves 118 travel is generally referred to as "back volume." The front volume serves as a pathway for sound waves 116 produced by top face 114a to travel to acoustic output opening 124 and then out of the enclosure 104, and into the open space that is surrounding a portable device in which the speaker assembly is integrated. The back volume of enclosure 104 helps to control the low frequency sound quality of the device. In particular, as SRS 114 moves up and down, it compresses the surrounding air. This compressed air can impede the larger up and down movement of SRS 114 at lower frequencies. The back volume alleviates this problem to some degree by increasing the volume of air around SRS 114 which in turn improves compliance of the surrounding air. It is therefore desirable for the back volume to be as large as possible.

The front volume should be relatively small compared to the back volume so that a direct pathway is provided to acoustic output opening 124. It is difficult, however, to maintain a small front volume due to manufacturing constraints that require speaker driver 112 to be set back a distance from acoustic opening 124 (which in most cases will be positioned next to the exit port of the portable device housing). For example, the front volume area 120, illustrated in FIG. 1 by dashed lines, can be defined by front volume chamber 126 having a width (w) substantially equivalent to that of speaker driver 112, a length (l) substantially equivalent to the width of enclosure 104 and a height (h) substantially equivalent to the distance between top face 114a of SRS 114 and top wall 106 of enclosure. Such a large area for sound travel to acoustic output opening 124 may not result in optimal sound output. Also, it can be seen that the large front volume area 120 extends into an area that could be used to increase a size of back volume area 122.

To improve sound output, FIG. 1 shows a reduced front volume chamber 128 formed by frame 102 and an enlarged back volume chamber 130. Reduced front volume chamber 128 may be formed by frame 102 and have any size and dimension sufficient to reduce the front volume area between speaker driver 112 and acoustic output opening 124, to less than that of chamber 126 defined by dashed lines. For example, in one embodiment, frame 102 includes frame sidewalls 150, 152 that extend vertically from top face 114a of SRS 114 to top wall 106 to isolate sound waves 116 generated by top face 114a from sound waves 118 generated by bottom face 114b. Opening 154 is formed in frame sidewall 152 so that sound waves 116 can travel from top face 114a in a direction of acoustic output opening 124.

Reduced front volume chamber 128 may be formed by chamber sidewalls 132, 134 that extend from opposing sides of opening 154 to acoustic output opening 124. In some embodiments, opening 154 is smaller than acoustic output opening 124 such that chamber sidewalls 132, 134 extend at an angle from opening 154 to acoustic output opening 124. Top chamber wall 136 also extends at an angle from a top side of opening 154 to acoustic output opening 124 and bottom chamber wall 138 extends from a bottom side of opening 154 to acoustic output opening 124. In this aspect, reduced front volume chamber 128 has a substantially horn shaped profile, which in turn reduces a size of the pathway through which sound waves 116 must travel to exit enclosure 104 through acoustic output port 124. Although in the illustrated embodiment, reduced front volume chamber 128 is formed by chamber sidewalls 132, 134, top chamber wall 136 and bottom chamber wall 138, it is contemplated that one or more of the walls may be omitted or configured in any manner sufficient to reduce the front volume area to less than that of the front volume area of chamber 126 (area defined by dashed lines).

The enlarged back volume chamber 130 includes the area between the outer surfaces of chamber sidewalls 132, 134, top chamber wall 136, bottom chamber wall 138 of reduced front volume chamber 128 and the walls forming enclosure 104. In this aspect, a portion of back volume chamber 130 may overlap a side of speaker driver 112 facing acoustic output opening 124. In other words, front volume area 120 is divided such that a portion of it becomes part of back volume chamber 130 resulting in back volume chamber 130 having an increased volume which is greater than a volume of reduced front volume chamber 128. In embodiments where acoustic output opening 124 is formed within one of sidewalls 110 of enclosure 104, the portion of back volume chamber 130 overlapping the side of driver 112 is between the side of the driver and sidewall 110. In addition, in embodiments where reduced front volume chamber 128 has a substantially horn shaped configuration as illustrated in FIG. 1, back volume chamber 130 is formed around reduced front volume chamber 128. For example, a portion of back volume chamber 130 may also be between reduced front volume chamber 128 and top wall 106 and/or bottom wall 108 of enclosure 104.

Figure 2:
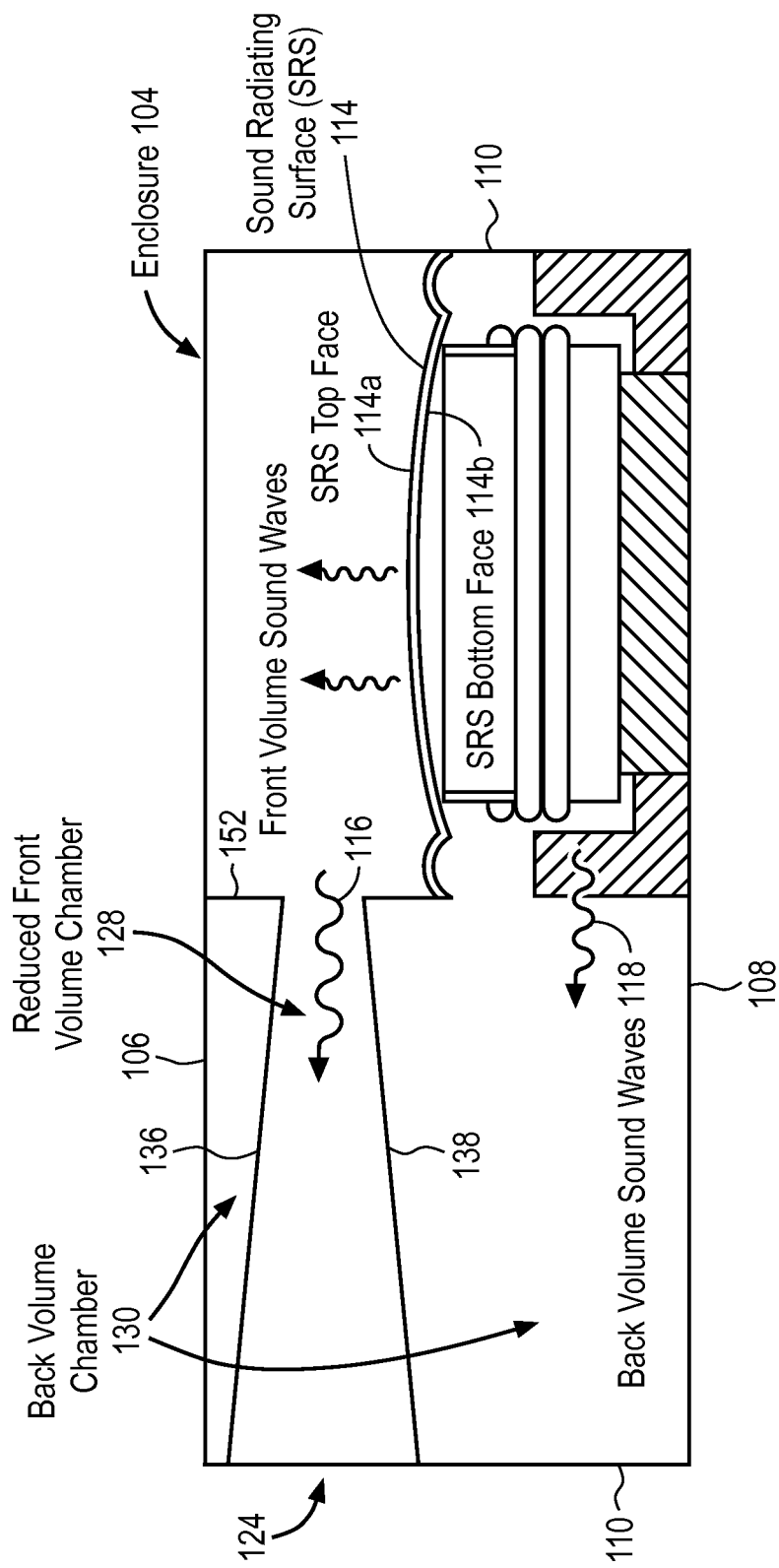
FIG. 2 is a cross-sectional side view of the embodiment of FIG. 1.
Figure 3:
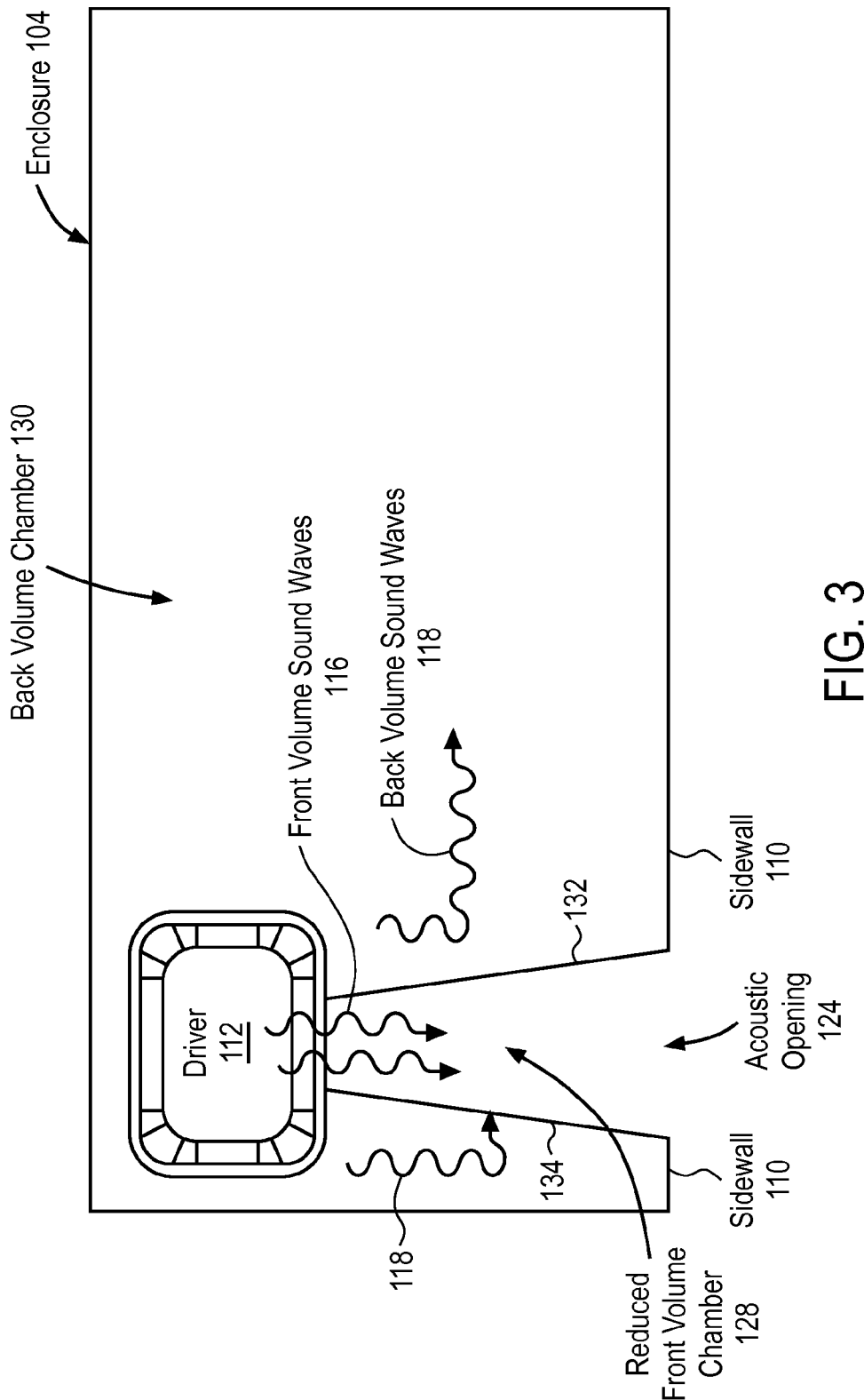
FIG. 3 is a top view of the embodiment of FIG. 1.

FIG. 2 illustrates a side cross-sectional view of the speaker assembly illustrated in FIG. 1. From this view, the portions of back volume chamber 130 between reduced front volume chamber 128 and top wall 106 and bottom wall 108 of enclosure 104 can be seen. FIG. 3 illustrates a top view of the speaker assembly illustrated in FIG. 1. From this view, the portions of back volume chamber 130 between the side of driver 112 facing acoustic opening 124 and sidewall 110 of enclosure 104 can be seen. In addition, the horn shape of reduced front volume chamber 128 is illustrated.

Figure 4:
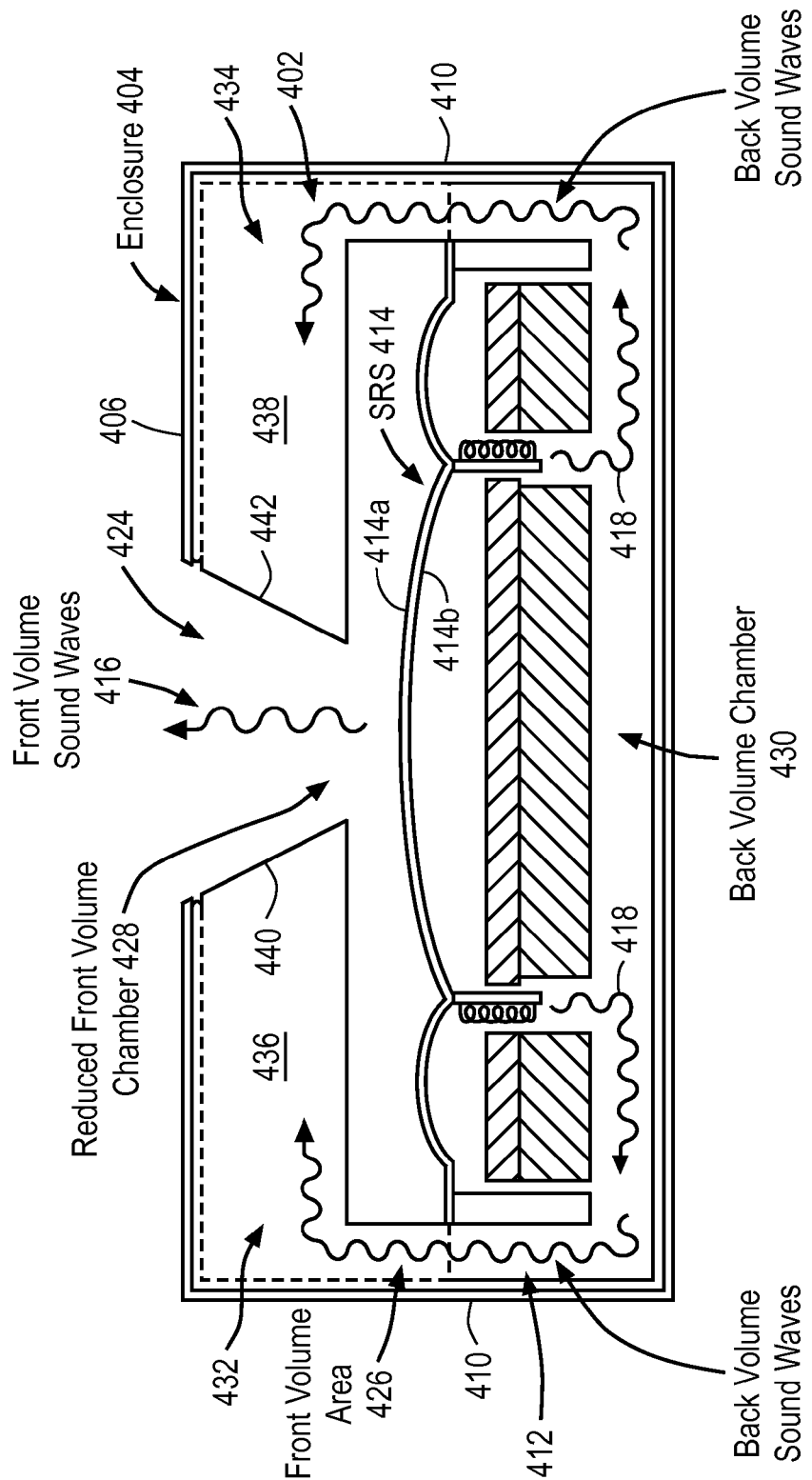
FIG. 4 is a cross-sectional side view of another embodiment of a speaker assembly having a reduced front volume.

FIG. 4 illustrates a side cross-sectional view of another embodiment of a speaker assembly. In this embodiment, acoustic output opening 424 is formed within top wall 406 of enclosure 404, and in particular directly above the SRS 414 of the speaker driver 412. When acoustic output opening 424 is formed within top wall 406, the front volume area 426 is generally defined as the area between top face 414a of SRS 414 of speaker driver 412, side walls 410 of enclosure 404 and top wall 406 of enclosure 404. The front volume area 426 is illustrated in FIG. 4 by dashed lines. This front volume area 426 is sealed off from the back volume area, which is generally defined as the area below bottom face 414b of SRS 414. In this aspect, sound waves 416 generated by top face 414a of SRS 414 are isolated from sound waves 418 generated by bottom face 414b of SRS 414b. Alternatively, an acoustic output opening may be formed in bottom wall 408 of enclosure 404 such that the front volume area may be defined as the area between bottom face 414b of SRS 414 and bottom wall 408 of enclosure 404 and the remaining area within enclosure 404 defines the back volume.

To create a reduced front volume chamber 428 having an area that is less than front volume area 426 (in other words, less than an area defined between top face 414a of SRS 414 and top wall 406 of enclosure 404), frame 402 includes overlapping segments 432, 434. Overlapping segments 432, 434 extend inwardly from sidewalls 410 of enclosure 404 and overlap top face 414a of speaker driver 412. Overlapping segments 432, 434 occupy a substantial area of front volume area 426 thereby providing a reduced front volume chamber 428. In addition, overlapping segments 432, 434 form pockets 436, 438 that connect to back volume chamber 430. In this aspect, back volume chamber 430 includes segments 432, 434 which overlap an area between driver 412 and top wall 406 of enclosure 404. In addition, ends 440, 442 of overlapping segments 432, 434 may be tapered inward toward one another such that a portion of reduced front volume chamber 428 is horn shaped. Although overlapping segments 432, 434 are shown having a substantially rectangular profile, it is contemplated that overlapping segments 432, 434 may have any shape and size suitable for reducing the front volume area and increasing the back volume area.

By allocating portions of the front volume area to back volume as previously discussed, the back volume area is substantially increased and the front volume area is reduced. For example, the back volume area of low rise devices is considered to be relatively small, for example, in the range of about 0.5 cubic cm to 2 cubic cm. According to the embodiments disclosed herein, however, the back volume chamber is substantially increased such that the back volume may be greater than, for example, 2 cubic cm.

Figure 5:
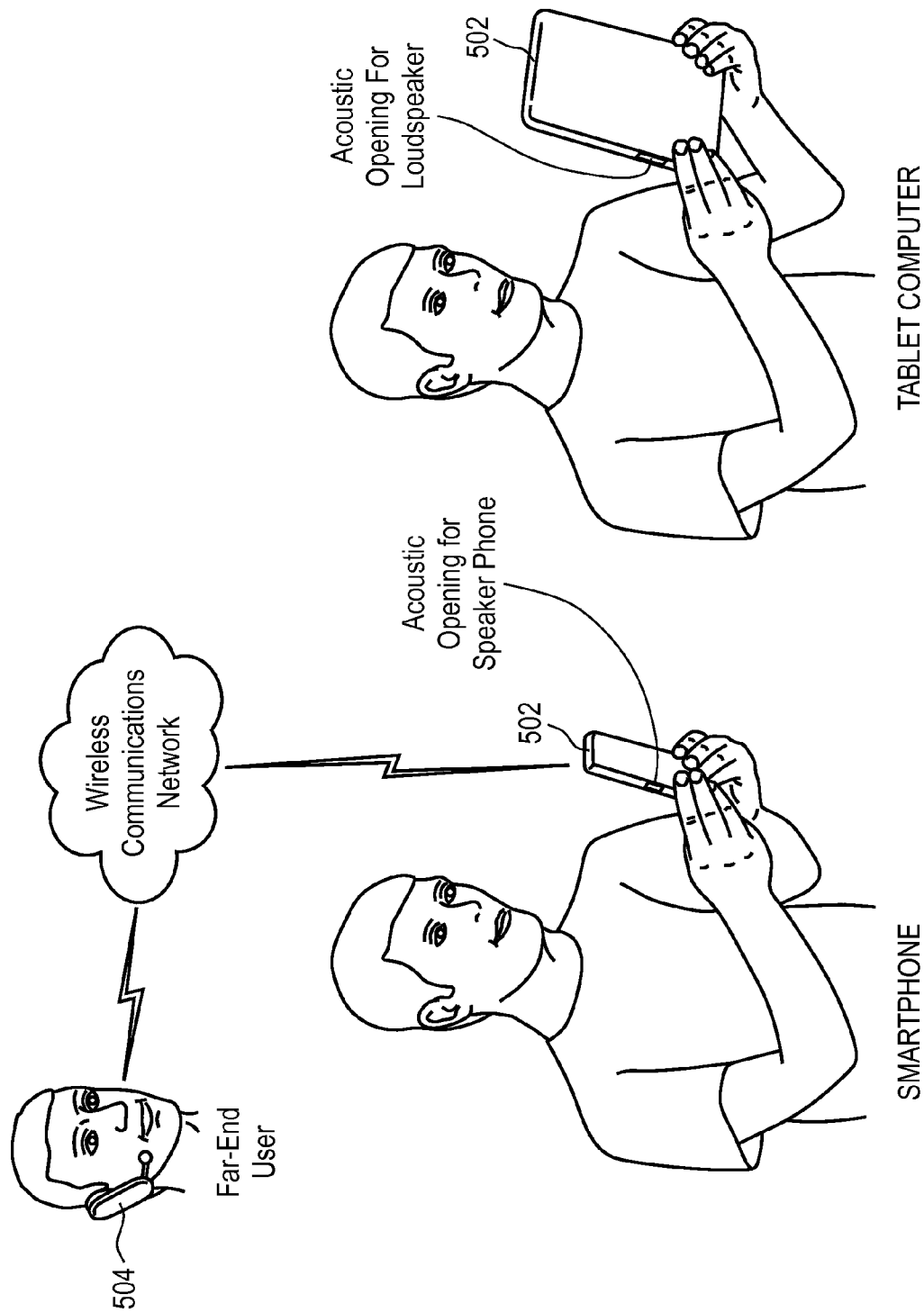
FIG. 5 depicts two instances of consumer electronics devices in which an embodiment of the invention may be implemented.

The concepts described here, however, need not be limited to speaker enclosures whose back volume is in that range. For example, as seen in FIG. 5, the speaker assembly having a reduced front volume may be a speakerphone unit that is integrated within a consumer electronic device 502 such as a smart phone with which a user can conduct a call with a far-end user of a communications device 504 over a wireless communications network; in another example, the speaker assembly may be integrated within the housing of a tablet computer. These are just two examples of where the speaker may be used, it is contemplated, however, that the speaker assembly may be used with any type of electronic device in which a reduced front volume area is desired, for example, a desk top computing device or a flat screen television.

Figure 6:
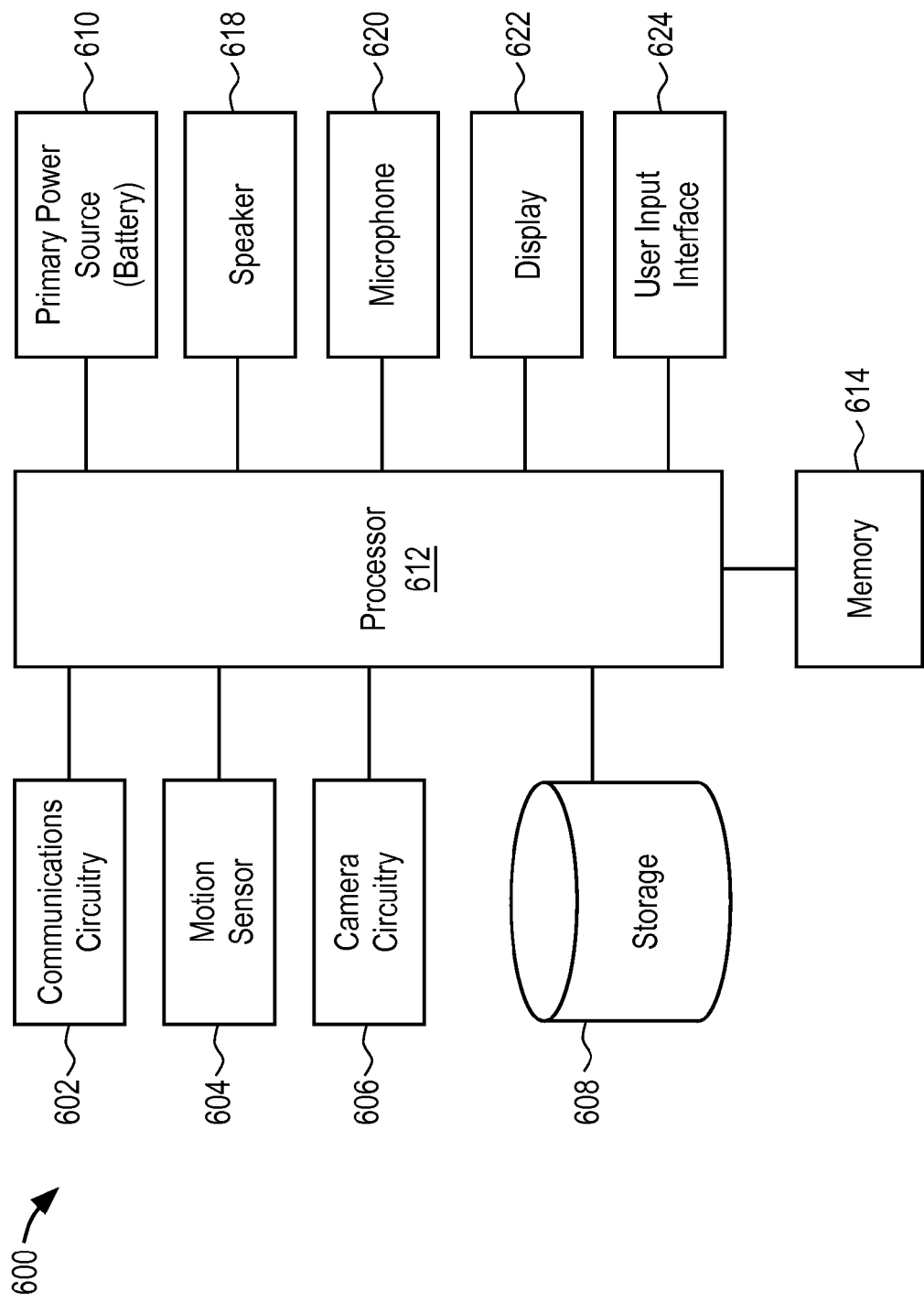
FIG. 6 is a block diagram of some of the constituent components of an embodiment of an electronic device in which an embodiment of the invention may be implemented.

FIG. 6 is a block diagram of some of the constituent components of an embodiment of an electronic device within which the previously described speaker assembly having a reduced front volume chamber may be implemented. Device 600 may be any one of several different types of consumer electronic devices that can be easily held in the user's hand during normal use. In particular, the device 600 may be any speaker-equipped mobile device, such as a cellular phone, a smart phone, a media player, or a tablet-like portable computer, all of which may have a built-in speaker system.

In this aspect, electronic device 600 includes a processor 612 that interacts with camera circuitry 606, motion sensor 604, storage 608, memory 614, display 622, and user input interface 624. Main processor 612 may also interact with communications circuitry 602, primary power source 610, speaker 618, and microphone 620. The various components of the electronic device 600 may be digitally interconnected and used or managed by a software stack being executed by the processor 612. Many of the components shown or described here may be implemented as one or more dedicated hardware units and/or a programmed processor (software being executed by a processor, e.g., the processor 612).

The processor 612 controls the overall operation of the device 600 by performing some or all of the operations of one or more applications or operating system programs implemented on the device 600, by executing instructions for it (software code and data) that may be found in the storage 608. The processor may, for example, drive the display 622 and receive user inputs through the user input interface 624 (which may be integrated with the display 622 as part of a single, touch sensitive display panel). In addition, processor 612 may send an audio signal to speaker 618 to facilitate operation of speaker 618.

Storage 608 provides a relatively large amount of "permanent" data storage, using nonvolatile solid state memory (e.g., flash storage) and a kinetic nonvolatile storage device (e.g., rotating magnetic disk drive). Storage 608 may include both local storage and storage space on a remote server. Storage 608 may store data as well as software components that control and manage, at a higher level, the different functions of the device 600.

In addition to storage 608, there may be memory 614, also referred to as main memory or program memory, which provides relatively fast access to stored code and data that is being executed by the processor 612. Memory 614 may include solid state random access memory (RAM), e.g., static RAM or dynamic RAM. There may be one or more processors, e.g., processor 612, that run or execute various software programs, modules, or sets of instructions (e.g., applications) that, while stored permanently in the storage 608, have been transferred to the memory 614 for execution, to perform the various functions described above.

The device 600 may include communications circuitry 602. Communications circuitry 602 may include components used for wired or wireless communications, such as two-way conversations and data transfers. For example, communications circuitry 602 may include RF communications circuitry that is coupled to an antenna, so that the user of the device 600 can place or receive a call through a wireless communications network. The RF communications circuitry may include a RF transceiver and a cellular baseband processor to enable the call through a cellular network. For example, communications circuitry 602 may include Wi-Fi communications circuitry so that the user of the device 600 may place or initiate a call using voice over Internet Protocol (VOIP) connection, transfer data through a wireless local area network.

The device 600 may include a motion sensor 604, also referred to as an inertial sensor, that may be used to detect movement of the device 600. The motion sensor 604 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RP detector, an RF or acoustic doppler detector, a compass, a magnetometer, or other like sensor. For example, the motion sensor 600 may be a light sensor that detects movement or absence of movement of the device 600, by detecting the intensity of ambient light or a sudden change in the intensity of ambient light. The motion sensor 600 generates a signal based on at least one of a position, orientation, and movement of the device 600. The signal may include the character of the motion, such as acceleration, velocity, direction, directional change, duration, amplitude, frequency, or any other characterization of movement. The processor 612 receives the sensor signal and controls one or more operations of the device 600 based in part on the sensor signal.

The device 600 also includes camera circuitry 606 that implements the digital camera functionality of the device 600. One or more solid state image sensors are built into the device 600, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 608. The camera circuitry 600 may also be used to capture video images of a scene.

Device 600 also includes primary power source 610, such as a built in battery, as a primary power supply.

In still further embodiments, the previously described speaker assembly having a reduced front volume chamber may be implemented within a non-mobile electronic device having a built-in speaker system, for example, a desk top computer or television. Similar to device 600, the non-mobile electronic device may include a processor that interacts with, a storage unit, memory unit, display, user input interface, communications circuitry, an optical drive, power supply, speaker, and microphone. The various components of the electronic device may be digitally interconnected and used or managed by a software stack being executed by the main processor. Many of the components shown or described here may be implemented as one or more dedicated hardware units and/or a programmed processor (software being executed by a processor, e.g., the main processor).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A portable audio electronic device comprising:
   an enclosure having a top wall, a bottom wall, a sidewall connecting the top wall to the bottom wall, an acoustic output opening and a back volume chamber, wherein the back volume chamber is defined in part by portions of the top wall, the bottom wall and the sidewall and the acoustic output opening is formed in the sidewall;
   a speaker driver positioned within the enclosure and resting against the bottom wall, the speaker driver comprising a sound radiating surface having a top face and a bottom face for emitting sound waves therefrom, wherein the top face faces the top wall; and
   a frame member attached to the speaker driver, the frame member having a) frame sidewalls that are positioned around the sound radiating surface and extend from the speaker driver to the top wall to form a first chamber over the sound radiating surface and b) chamber walls extending from an opening in one of the frame sidewalls to the acoustic output opening to form a second chamber, the first chamber and the second chamber forming a front volume chamber acoustically coupling the top face of the sound radiating surface to the acoustic output opening, and
   wherein the back volume chamber is acoustically coupled to the bottom face of the sound radiating surface, and wherein a portion of the back volume chamber is formed by a space surrounding the frame sidewalls and chamber walls of the front volume chamber and a volume of the back volume chamber is greater than a volume of the front volume chamber.

2. The portable audio electronic device of claim 1 wherein the portion of the back volume chamber formed by the space surrounding the frame sidewalls and chamber walls of the front volume chamber is between a side of the driver and the enclosure sidewall.

3. The portable audio electronic device of claim 1 wherein the front volume chamber comprises a horn shape.

4. The portable audio electronic device of claim 1 wherein the portion of the back volume chamber formed by the space surrounding the frame sidewalls and chamber walls of the front volume chamber is between the front volume chamber and the top wall of the enclosure.

5. A speaker assembly comprising:
   an enclosure having a top wall, a bottom wall, a sidewall connecting the top wall to the bottom wall, an acoustic output opening and a back volume defined by the top wall, the bottom wall and the sidewall;
   a speaker driver positioned within the enclosure and resting against the bottom wall, the speaker driver comprising a sound radiating surface having a top face and a bottom face for emitting sound waves therefrom, wherein an area between the top face of the sound radiating surface, the top wall of the enclosure and the sidewall of the enclosure defines a front volume area within the enclosure; and
   a frame member attached to the speaker driver, the frame member forming (1) a front volume chamber within the front volume area acoustically couples the top face of the sound radiating surface to the acoustic output opening and (2) a back volume chamber acoustically coupling the bottom face of the sound radiating surface to the back volume, and
   wherein the front volume chamber comprises frame sidewalls which surround the top face of the sound radiating surface and extend to the top wall to form a first chamber over the sound radiating surface, one of the frame sidewalls forming a frame opening between the speaker driver and the acoustic output opening, and chamber sidewalls forming a second chamber, which is between the speaker driver and the acoustic output opening, and wherein the second chamber acoustically couples the frame opening to the acoustic output opening, and
   wherein the frame opening is smaller than an area of the frame sidewall, a space surrounding the chamber sidewalls and the frame sidewall forms a portion of the back volume chamber and a volume of the back volume chamber is greater than a volume of the front volume chamber.

6. The speaker assembly of claim 5 wherein an area defined by the front volume chamber is less than an area defined by the back volume chamber.

7. The speaker assembly of claim 5 wherein the acoustic output opening is formed within the sidewall of the enclosure and a portion of the front volume chamber is positioned between the speaker driver and the sidewall of the enclosure.

8. The speaker assembly of claim 5 wherein the front volume chamber comprises a horn shape.

9. The speaker assembly of claim 5 wherein a portion of the back volume chamber extends between the front volume chamber and the top wall of the enclosure.

10. An electronic audio system comprising:
    an enclosure having a top wall, a bottom wall, a sidewall connecting the top wall to the bottom wall, an acoustic output opening and a back volume chamber, wherein the back volume chamber is defined in part by portions of the top wall, the bottom wall and the sidewall;
    a speaker driver positioned within the enclosure and resting against the bottom wall, the speaker driver comprising a sound radiating surface having a top face and a bottom face for emitting sound waves therefrom; and
    a frame member attached to the speaker driver, the frame member forming a front volume chamber acoustically coupling the top face of the sound radiating surface to the acoustic output opening and the back volume chamber, which is acoustically coupled to the bottom face of the sound radiating surface, wherein the front volume chamber comprises frame sidewalls extending to the top wall so as to divide the front volume chamber into a first chamber over the sound radiating surface and a second chamber between the speaker driver and the acoustic output opening, one of the frame sidewalls having a frame opening acoustically coupled to the acoustic output opening by chamber sidewalls, a space surrounding the chamber sidewalls connects to the back volume chamber, and a volume of the back volume chamber is greater than a volume of the front volume chamber;

a memory to store an operating system program; and a processor coupled to the memory to execute the operating system program and to send an audio signal to the speaker driver.

* * * * *

UNITED STATES PATENT AND TRADEMARK OFFICE
CERTIFICATE OF CORRECTION

| | | |
|---|---|---|
| PATENT NO. | : 9,154,869 B2 | Page 1 of 1 |
| APPLICATION NO. | : 13/343606 | |
| DATED | : October 6, 2015 | |
| INVENTOR(S) | : Cohen et al. | |

It is certified that error appears in the above-identified patent and that said Letters Patent is hereby corrected as shown below:

In the Claims, Column 8, Claim 5, line 21, please delete "area acoustically couples" and insert -- "area that acoustically couples" --.

Signed and Sealed this
Seventh Day of June, 2016

Michelle K. Lee
*Director of the United States Patent and Trademark Office*